US011472594B2

(12) United States Patent
Garverick et al.

(10) Patent No.: US 11,472,594 B2
(45) Date of Patent: Oct. 18, 2022

(54) DOUBLE-SKIVED PAPER-BASED CONTAINER

(71) Applicant: Carton Service CSI, LLC, Shelby, OH (US)

(72) Inventors: Scott Garverick, Shelby, OH (US); Reid Lederer, Shelby, OH (US); Mike Robinette, Shelby, OH (US); David Higgins, Shelby, OH (US); Warren Turner, Shelby, OH (US)

( * ) Notice: Subject to any disclaimer, the term of this patent is extended or adjusted under 35 U.S.C. 154(b) by 0 days.

(21) Appl. No.: 17/315,775

(22) Filed: May 10, 2021

(65) Prior Publication Data

US 2022/0106071 A1 Apr. 7, 2022

Related U.S. Application Data

(60) Provisional application No. 63/147,305, filed on Feb. 9, 2021, provisional application No. 63/088,495, filed on Oct. 7, 2020.

(51) Int. Cl.
*B65D 5/06* (2006.01)
*B65D 5/42* (2006.01)
*B31B 50/64* (2017.01)
*B31B 50/20* (2017.01)
*B31B 110/10* (2017.01)
(Continued)

(52) U.S. Cl.
CPC ............. *B65D 5/067* (2013.01); *B31B 50/20* (2017.08); *B31B 50/64* (2017.08); *B65D 5/4266* (2013.01); *B31B 50/142* (2017.08); *B31B 2100/00* (2017.08); *B31B 2110/10* (2017.08)

(58) Field of Classification Search
CPC .... B65D 5/067; B65D 5/4266; B65D 5/4279; B29C 66/71; B29C 66/135; B29C 66/112; B29C 66/4322; B29C 66/43122; B29L 2031/7166; B29L 2031/7162; B65B 51/144; B65B 51/26; B32B 2539/70; B32B 2250/40; B31B 50/64; B31B 2105/001
USPC ........... 229/138, 198.2, 5.84, 184, 249, 132, 229/5.81, 213, 122.32, 193; 493/287, 493/295, 129, 133, 183, 60; 428/124, 57, 428/130; 409/138
See application file for complete search history.

(56) References Cited

U.S. PATENT DOCUMENTS 1,698,532 A * 1/1929 Brooks ................ B31F 1/0038
   229/198.2
4,802,620 A * 2/1989 Phillips ................ B65D 5/067
   229/125.42

(Continued)

*Primary Examiner* — Christopher R Demeree
(74) *Attorney, Agent, or Firm* — Brennan, Manna & Diamond, LLC

(57) ABSTRACT

The present invention relates generally to a new and improved paper-based container. More specifically, the invention relates to a paper-based container that is comprised of a relatively low-density polyethylene coating on one or both surfaces of the container and at least two skive flaps, wherein each of said skive flaps is created during the manufacturing process. The skive flap further comprises at least one leading edge of the container body, and prevents unwanted moisture from entering the container and the contents of the container from saturating the paper-based material. One skive flap is preferably folded in a manner in which a portion of the outside surface of the container is adhered to the inside surface, and a second skive flap is adhered to the outside surface.

13 Claims, 10 Drawing Sheets

(51) Int. Cl.
 *B31B 50/14* (2017.01)
 *B31B 100/00* (2017.01)

(56) References Cited

U.S. PATENT DOCUMENTS

| | | | | |
|---|---|---|---|---|
| 5,810,243 A * | 9/1998 | DiPinto | ................ | B65D 5/4279 |
| | | | | 229/198.2 |
| 6,554,182 B1 * | 4/2003 | Magnusson | .......... | B65D 5/4279 |
| | | | | 229/125.42 |
| 10,759,577 B2 * | 9/2020 | Sasaki | ........................ | B32B 7/12 |
| 11,072,454 B2 * | 7/2021 | Wada | ..................... | B65D 5/064 |

* cited by examiner

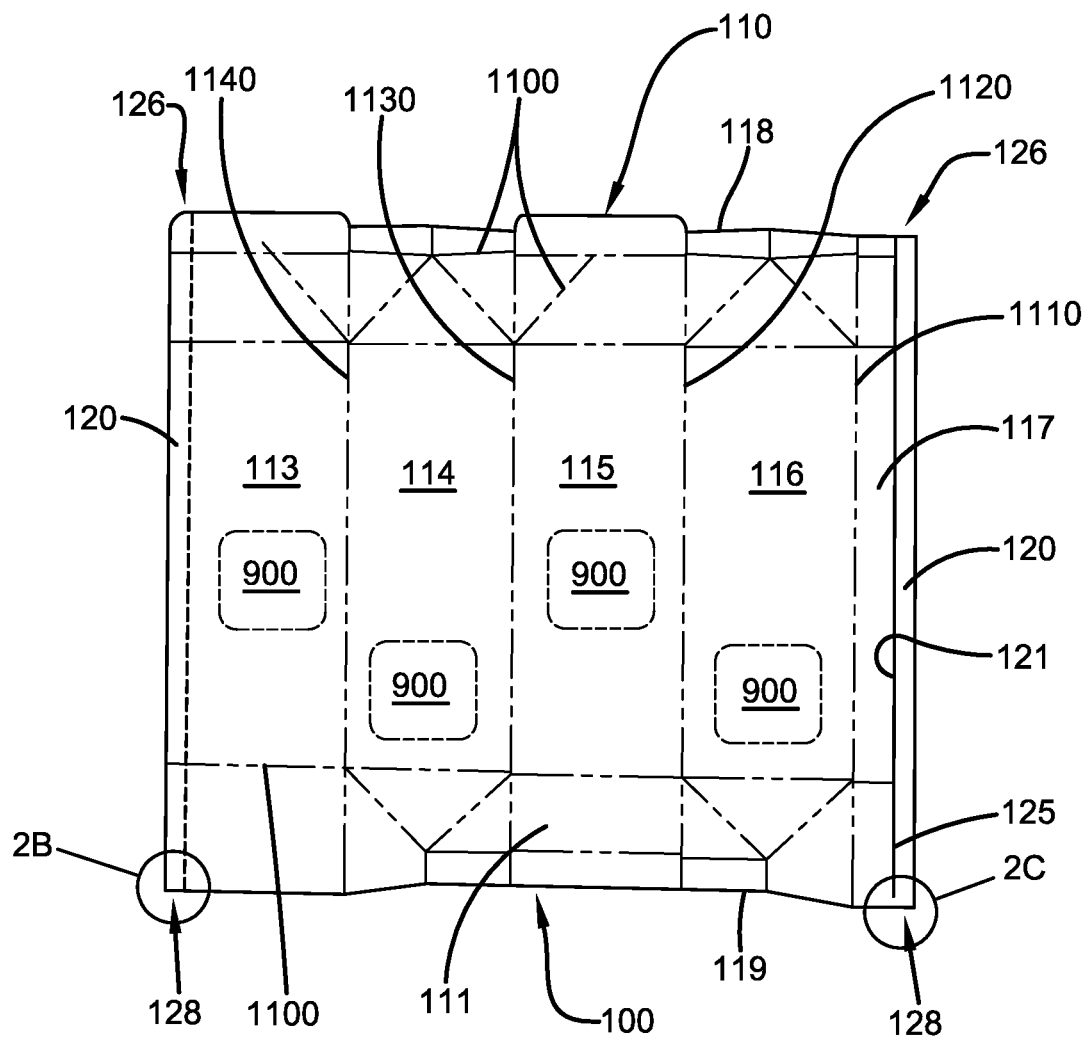
FIG. 2A
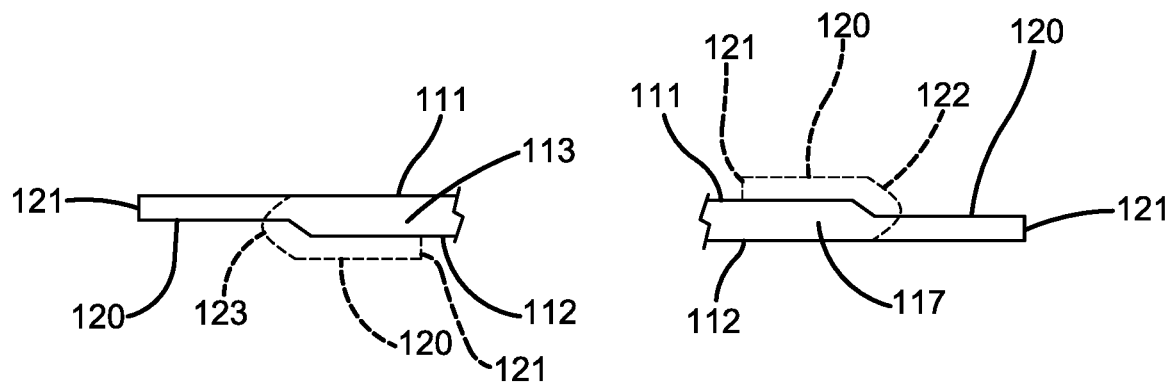
FIG. 2B  FIG. 2C

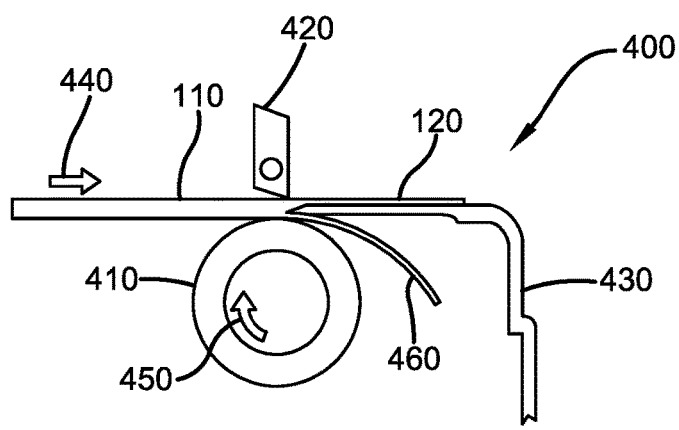
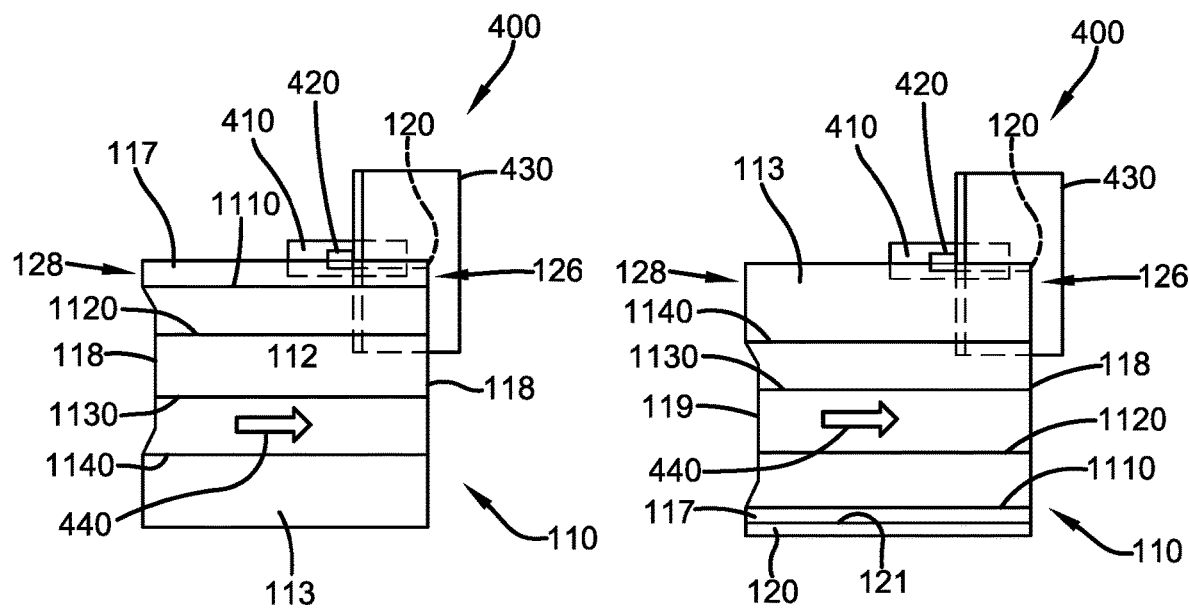
FIG. 6A
FIG. 6B
FIG. 6C

DOUBLE-SKIVED PAPER-BASED CONTAINER

CROSS-REFERENCE TO RELATED APPLICATIONS

The present application claims priority to, and the benefit of, U.S. Provisional Application No. 63/088,495, which was filed on Oct. 7, 2020 and U.S. Provisional Application No. 63/147,305, which was filed on Feb. 9, 2021, both of which are incorporated herein by reference in their entirety.

FIELD OF THE INVENTION

The present invention relates generally to a new and improved paper-based container. More specifically, the invention relates to a gable-topped paper-based container that is comprised of a low-density polyethylene coating on one or both surfaces of the container, and at least two skived flaps, wherein said skived flaps are created during the manufacturing process. Each skive flap comprises at least one leading edge of the container body, and prevents both moisture from entering the container along the flap and the contents of the container from saturating the paper of the material, thereby weakening the material and potentially leading to odor/product leakage. Each skive flap is preferably folded and constructed in such a manner that a portion of the outside surface of the container is adhered to the inside surface. One of the skive flaps is located on an inside portion of the container, and one is located on an exterior portion of the container, thereby offering double protection against leakage. Additionally, the container may also comprise a plurality of additional body flaps and an extra-long neck portion to account for the extra board area created by the flap(s). Accordingly, specific reference is made thereto in the present disclosure. However, it is to be appreciated that aspects of the present invention are also equally amenable to other like applications, devices and methods of manufacture.

BACKGROUND OF THE INVENTION

Single-use plastic containers are commonly used to store and hold liquid items including juices, milks, drinks, beverages, sauces, etc., dry items including powders, mixes, etc., and semi-solid items including potato salad, coleslaw, etc. Said plastic containers also exist in the form of shampoo bottles, soap bottles, cleaning agent bottles, etc. and any other product of the like. Such plastic containers are typically disposed of after use, and unfortunately find their way into oceans, rivers, and other areas as environmental pollutants. As such, materials and practices have been developed regarding the use of bio-degradable materials in place of plastics that have been typically used in single-use solid, semi-solid and liquid food/product containers.

Existing bio-degradable materials are often paper-based, and because of the manufacturing process contain a paperboard section that exists in between the outside surface of the material and the inside surface of the material. Unfortunately, this type of construction has a number of inherent limitations including, for example, the possibility of moisture entering the container or the contents leaking from the container. As with paper-based containers/packaging, the probability of leakage is greater than that of a single-use plastic container due to the manufacturing process which normally involves the folding and adhesion of the paper-based body via a plurality of seams. As a result, improper adhesion or assembly near the seams may result in leakage of the contents of the container by virtue of the folding assembly that must take place with a paper-based material. However, this is not the case with a single-use plastic container, which is typically one integral body without the presence of seams (or at least having fewer seams). Seams are where improper adhesion and/or gaps and openings can occur. If leakage does occur in a paper-based container, the product contained within the container may spill to surrounding surfaces, which is undesirable and potentially damaging.

Further, paper-based products are normally comprised of an outer surface on the exterior of the container, an inner surface on the inside of the container and another paper layer in between said layers as noted supra. When storing liquids/foods/products, this paper layer provides a means for unwanted moisture to enter the container and/or for the contents of the container to leach into the paper-based material, therefore essentially saturating the material with the contents, and weakening the integrity of the material and subsequently the entire container. As a result, physical and/or odor leakage of the contents of the container can occur due to the structural weakening of the material. Additionally, the problem may be further exacerbated if such paper-based containers are required to sit dormant (e.g. on a supermarket shelf) for prolonged periods of time, wherein the container contents and their compounds have ample time to saturate and weaken the paper-based material.

Therefore, there exists a long felt need in the art for an improved paper-based container that provides greater protection against unwanted moisture entering the container and/or physical leakage/saturation of the contents of the container than existing paper-based containers. There is also a long felt need in the art for an improved paper-based container that provides greater protection against odor leakage than existing paper-based containers. Finally, there is a long felt need in the art for an improved paper-based container that is relatively inexpensive to manufacture and that is resistant to the breakdown caused by storing contents for a prolonged period of time.

The present invention, in one exemplary embodiment, discloses an improved container, such as a gable-top container or carton, that is comprised of a bio-degradable paper-based material having a relatively low-density polyethylene coating on one or both surfaces/sides of the material, and a related method of manufacture. The container is further comprised of a plurality of extra carton flaps, a relatively long carton neck area, and at least two skiving flaps that engage the inside/outside surfaces of the container.

In this manner, the improved paper-based container device of the present invention accomplishes all of the forgoing objectives, thereby providing a paper-based container that is more resistant to unwanted moisture entering the container, saturation of the paperboard, and physical and odor leakage of the contents of the container than existing paper-based containers.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises an improved paper-based container and a method of manufacturing the same. The container is preferably comprised of a bio-degradable and paper-based material that is coated on one or both sides with a relatively low-density polyethylene coating. The container is also comprised of a plurality of flaps that fold in the assembly process to allow the container to form a retained shape. In addition, the container is comprised of a plurality of additional flaps (e.g. flaps that would not typically be found on containers of similar construction) that allow for extra board coverage that is needed by virtue of the skiving process.

More specifically, the skiving process occurs during the manufacturing/assembly of the container, and involves shaving-off the thickness of a paper-based material such as, but not limited to, paper-based and low-density polyethylene coated "milk stock", wherein the material is planed down, folded from the outside surface onto the inside surface, and adhered thereto with heat from a flame. The manner in which the container is planed, folded and heated produces at least two skived flaps that are adhered to both the inside and outside surfaces of the container. Said double skived flaps then prevent unwanted moisture from entering the container and/or the saturation of the material by the contents of the container permeating the paperboard material. This double skived process in turn creates a container that is in essence "seamless", wherein the double skived container also becomes incredibly resistant to unwanted moisture entering the container and/or container breakdown as a result of the solid, semi-solid or liquid contents of the container permeating the paperboard material, and any subsequent content/odor leakage that could occur as a result of said permeation.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 2A illustrates a top view of an improved paper-based container device of the present invention of in an unassembled/unfolded state with the printed outside surface facing upward in accordance with the disclosed architecture;

FIG. 2B illustrates an enlarged detailed view of the second skived edge of the improved paper-based container device of the present invention of FIG. 2A showing the skived flap in both a skived condition and a folded condition in accordance with the disclosed architecture;

FIG. 2C illustrates an enlarged detailed view of the first skived edge of the improved paper-based container device of the present invention of FIG. 2A showing the skived flap in both a skived condition and a folded condition in accordance with the disclosed architecture;

FIG. 6A illustrates a diagrammatic view of a generalized skiving process that is used on a container template body of the present invention in accordance with the disclosed architecture;

FIG. 6B illustrates a top perspective view of the first pass skiving process that is used on a container template body of the present invention in accordance with the disclosed architecture;

FIG. 6C illustrates a top perspective view of the second pass skiving process that is used on a container template body of the present invention in accordance with the disclosed architecture;

DETAILED DESCRIPTION

Figure 1A:
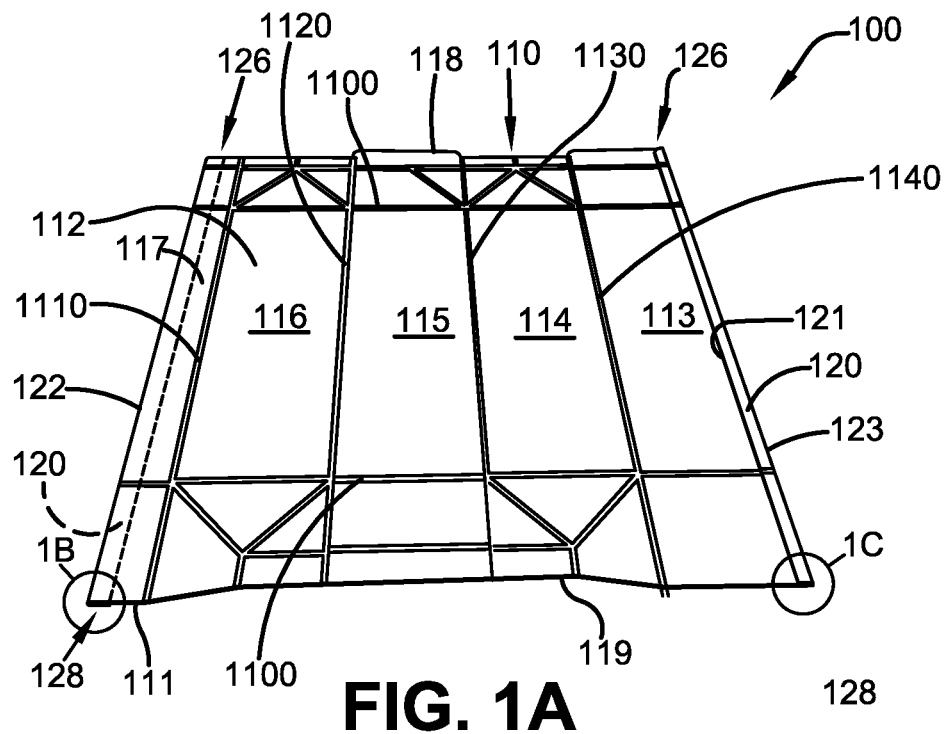
FIG. 1A illustrates a perspective view of an improved paper-based container device of the present invention in an unassembled/unfolded state with the inside surface facing upward in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there is a long felt need in the art for an improved paper-based container that provides greater protection that existing paper-based containers against unwanted moisture entering the container and/or physical leakage/saturation of the contents of the container. Moreover, there is a long felt need in the art for an improved paper-based container that provides greater protection against odor leakage than existing paper-based containers. Finally, there is a long felt need in the art for an improved paper-based container that is relatively inexpensive to manufacture, and that is resistant to the breakdown caused by storing contents for a prolonged period of time.

The device of the present invention is designed to provide a user with a bio-degradable and environmentally-friendly paper-based alternative to single-use plastic containers for storing goods such as, but not limited to, dry ingredients, liquids, solids, semi-solids, liquid soap, shampoo, body wash, cleaning agents, detergents, etc. The additional viscosity of these types of pressurized or non-pressurized contents while in a temperature-controlled environment make them particularly prone to leakage. The container is preferably comprised of a bio-degradable paper-based material that is further comprised of an outside surface, a paperboard material (e.g., an SBS paperboard) and an inside surface, wherein the inside surface is in direct contact with the contents of the container (e.g., a juice) and the outside surface is in contact with the external environment. As used herein, "milk stock" or "paperboard material" is preferably comprised of a paperboard constructed with a polyethylene liner on the inside and on the outside, though other embodiments are also contemplated.

Referring initially to the drawings, FIG. 1A illustrates a perspective view of an improved paper-based container device 100 of the present invention in an unassembled/unfolded state with the inside surface 112 facing upward in accordance with the disclosed architecture. More specifically, the device 100 is comprised of a container template body 110 that is folded to assemble the device 100 into, for example, a gable-topped container. However, differing embodiments of the device 100 may comprise a plurality of differing container shapes, types, sizes, etc., and the present invention is not necessarily limited to gable top containers.

The template body 110 is comprised of a plurality of panels that correspond and create the various surfaces/sides of the container device 100 when folded along the various scores 1100 formed within the surface of the container template body 110. In the shown embodiment of the device 100, the body 110 is comprised of a first panel 113, a second panel 114, a third panel 115, a fourth panel 116 and a fifth panel 117. Specifically, panels 113, 114, 115, and 116 will form the sides of an open-ended box-like structure after the scores 1110, 1120, 1130, 1140 are folded. It is contemplated that the printed outside surface 111 and inside surface 112 of the body 110 are comprised of a paper-based or paperboard material that is further coated in a film/coating of relatively low-density polyethylene (LDPE) on one or both of the inside 112 and outside 111 surfaces. Said material may hereinafter be referred to as "milk stock". However, in differing embodiments the body 110 may be additionally or alternatively comprised of LDPE-coated paperboard, SBS paperboard, or other suitable materials.

Figure 1B:
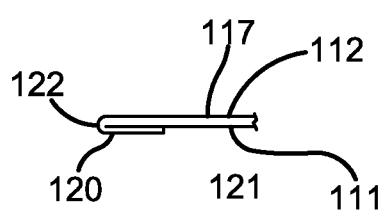
FIG. 1B illustrates an enlarged detailed view of the first skived edge of the improved paper-based container device of the present invention of FIG. 1A in accordance with the disclosed architecture.
Figure 1C:
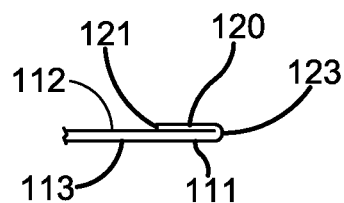
FIG. 1C illustrates an enlarged detailed view of the second skived edge of the improved paper-based container device of the present invention of FIG. 1A in accordance with the disclosed architecture.

The body 110 is further comprised of at least two skived flaps 120. Each of the skived flaps 120 is created during a manufacturing method (that will be explained more fully below) from the milk stock material using a cutting die to initially plane the material down. The planed material is then folded onto itself such that a portion of the outside surface 111 becomes relatively flush with and is "folded over" and adhered to the inside surface 112 with heat from a flame to form the skived flap 120, which is shown in FIGS. 2B and 2C. Each skived flap 120 then forms the first skived edge 122 and the second skived edge 123 of the container 100, as shown in FIGS. 1B and 1C, respectively. It is contemplated that in differing embodiments of the device 100, the skived flap 120 may comprise any skived edge, like 122 or 123, of any side, and the device 100 may be comprised of any number of skived flaps 120.

Each of the skived flaps 120 is further comprised of a first end 126 that is preferably located at the top edge 118 and a second end 128 that is preferably located at the bottom edge 119, wherein said first and second ends 126, 128 may be rounded, beveled, chamfered, etc. so as to not interfere with the folding/assembling of the container 100. The adhesion (via heat from a flame) of the skived flap 120 to the inside surface 112 (as shown in FIGS. 1C and 2B) and to the printed outside surface 111 (as shown in FIGS. 1B and 2C) ensures that the contents of the container 100 do not come into direct contact with the paperboard material, wherein said contents could saturate the milk stock or paperboard material as described supra. The container 100 may also comprise a plurality of extra flaps (not shown), and a relatively long neck region (not shown) to compensate for the additional coverage required to provide a surface for the adhesion of the skived flap 120.

Figure 4:
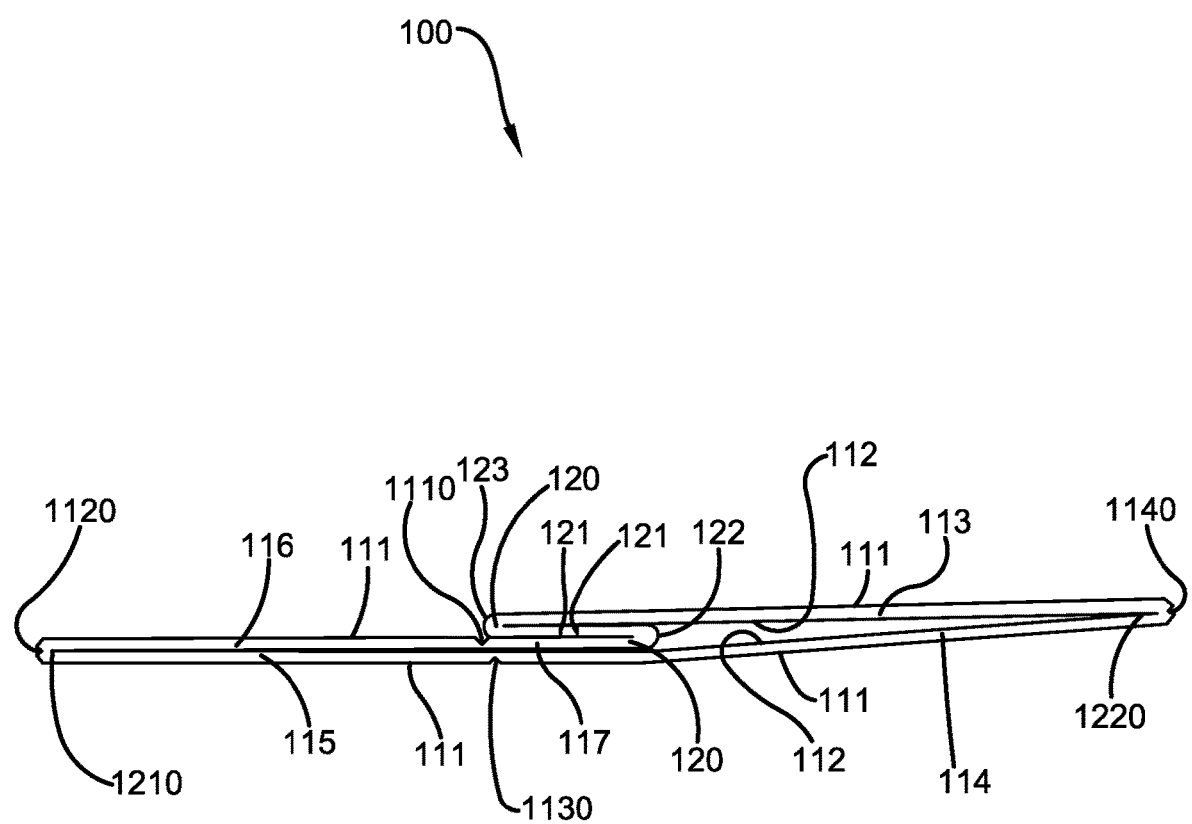
FIG. 4 illustrates an end view of how the two skived flaps of an improved paper-based container device of the present invention are joined together in accordance with the disclosed architecture.

FIG. 1B illustrates an enlarged detailed view of the first skived edge 122 of the improved paper-based container device of the present invention of FIG. 1A in accordance with the disclosed architecture. The first skived edge 122 is created by forming a skived flap 120 using material from the fifth panel 117. In doing so, the raw carton edge 121 will be sealed from any moisture exposure after the novel sealing process is completed, as best shown in FIG. 4.

FIG. 1C illustrates an enlarged detailed view of the second skived edge 123 of the improved paper-based container device of the present invention of FIG. 1A in accordance with the disclosed architecture. The second skived edge 123 is created by forming a skived flap 120 using material from the first panel 113. In doing so, the raw carton edge 121 will be sealed from any moisture exposure after the novel sealing process is completed, as best shown in FIG. 4.

FIG. 2A illustrates a top view of an improved paper-based container device 100 of the present invention in an unassembled/unfolded state with the printed outside surface 111 facing upward in accordance with the disclosed architecture. Referring initially to FIG. 1A where the inside surface 112 is shown, FIG. 2A will now be similarly described with the printed outside surface 111 of a novel container template body 110 being shown. Any number of printed images 900 can be placed on the printed outside surface 111 of the container template body 110.

It should be noted that since the container template body 110 has now been flipped-over as shown in FIGS. 2A-2C, panels 113, 114, 115, 116, and 117 will now be shown in a reversed order from what was shown in FIGS. 1A-1C. Further, it should be noted that due to the change in orientation of the figures, the first skived edge 122 as shown on the left-hand side of the container template body 110 in FIG. 1A will now be shown on the right-hand side of the container template body 110 in FIG. 2A. Likewise, the second skived edge 123 as shown on the right-hand side of the container template body 110 in FIG. 1A will now be shown on the left-hand side of the container template body 110 in FIG. 2A. The item numbering in both figures remains the same.

FIGS. 2A-2C further include details related to the double skiving and folding process of the present invention container device 100. Skiving flaps 120 created on both the left and right sides of the container template body 110 serve to protect the raw carton edges 121. FIG. 2B illustrates an enlarged detailed view of the second skived edge 123 of the improved paper-based container device 100 of the present invention of FIG. 2A showing the skived flap 120 in both a skived condition and a folded condition in accordance with the disclosed architecture, which will be more fully described if FIGS. 6A-6C, and 7-10 herein. Additionally, FIG. 2C illustrates an enlarged detailed view of the first skived edge 122 of the improved paper-based container device 100 of the present invention of FIG. 2A showing the skived flap 120 in both a skived condition and a folded condition in accordance with the disclosed architecture.

Figure 3:
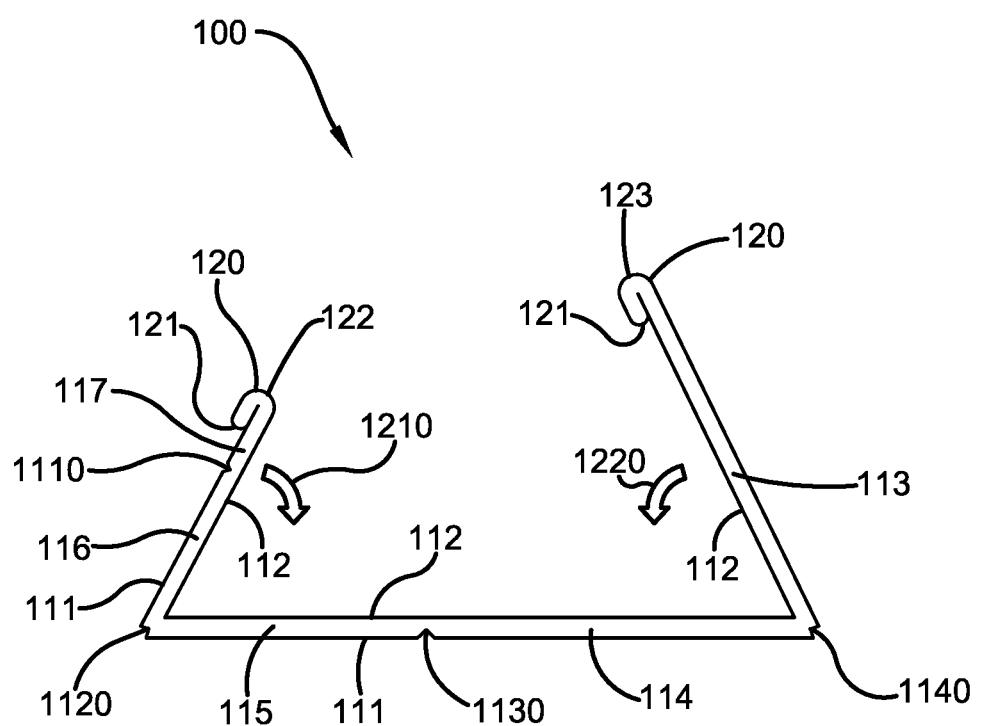
FIG. 3 illustrates an end view of how the two corner folds are formed to facilitate the joining of the two skived flaps of an improved paper-based container device of the present invention in accordance with the disclosed architecture.

FIG. 3 illustrates an end view of how the two corner folds 1210 and 1220 are formed to facilitate the joining of the two skived flaps 120 of an improved paper-based container device 100 of the present invention in accordance with the disclosed architecture. After the completion of the double skiving and folding process is completed, the first corner fold 1210 is made along the location of the second score 1120 by folding the portion of the container template body 110 containing the fourth panel 116 and the fifth panel 117 as shown. The second corner fold 1220 is made along the location of the fourth score 1140 by folding the portion of the container template body 110 containing the first panel 113 as shown. Both corner folds are made such that the inside surface 112 of container template body 110 form two acute angles as shown. The remaining two corner folds 1230 and 1240, made along the first score 1110 and the third score 1130, will be made in a later operation more fully described in FIG. 5.

FIG. 4 illustrates an end view of how the two skived flaps 120 of an improved paper-based container device 100 of the present invention are joined together in accordance with the disclosed architecture. The two corner folds 1210 and 1220 that were described in FIG. 3 are now completely or sustainably closed, thereby bringing the skived flap 120 of the first panel 113 into direct contact with the printed outside surface 111 of the fifth panel 117. At the same time, the skived flap 120 of the fifth panel 117 is brought into direct contact with the inside surface 112 of the first panel 113. The two skived flaps 120 form a leakproof connection, thereby protecting each of the raw carton edges 121. The skived flaps 120 are bonded to panels 113 and 117, either by a melting process or adhesive process. This bonding process will be more fully described in FIGS. 8 and 10 herein. It should be noted that no bonding between inside surfaces 112 of panels 114, 115, 116, or 117 can occur. If this were to happen, inadvertent bonding would prevent the forming of the remaining corner folds, which will be located along the first score 1110 and the third score 1130. The forming of the remaining corners will be more fully described in FIG. 5.

Figure 5:
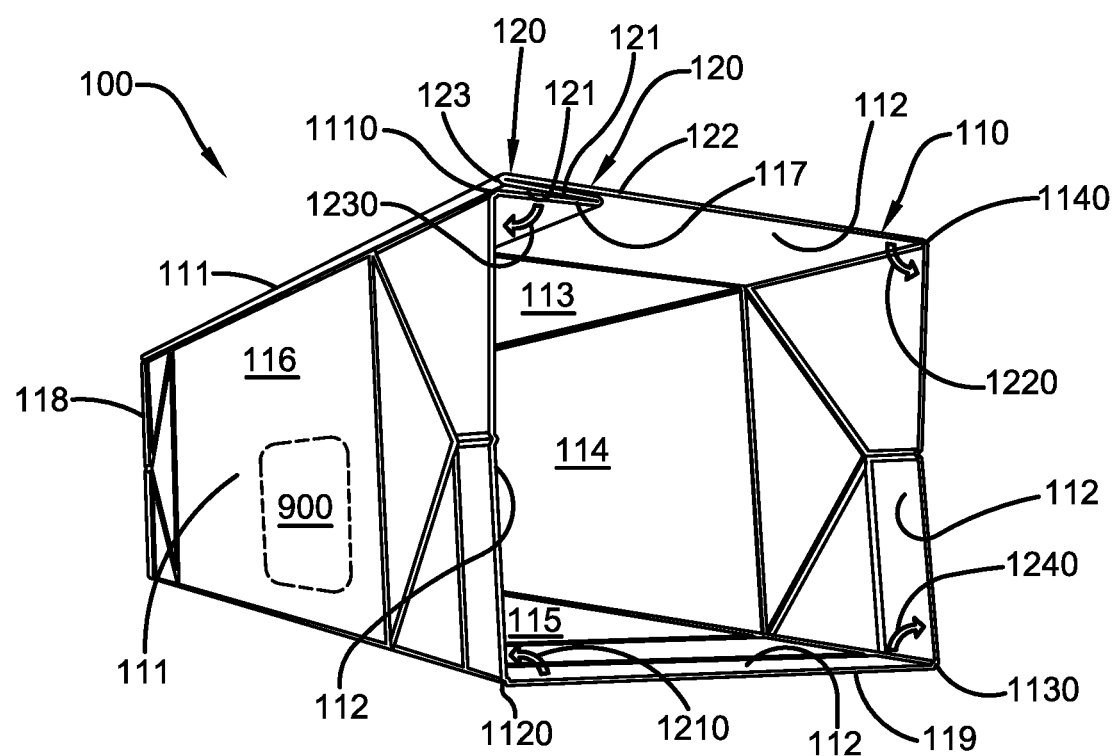
FIG. 5 illustrates a perspective view of an improved paper-based container device of the present invention in a partially assembled/folded state resembling an open-ended box-like structure in accordance with the disclosed architecture.

FIG. 5 illustrates a perspective view of an improved paper-based container device 100 of the present invention in a partially assembled/folded state resembling an open-ended box-like structure in accordance with the disclosed architecture. The third corner fold 1230 is made along the first score 1110, forming an approximate perpendicular angle between the fourth panel 116 and the fifth panel 117. At the same time, the fourth corner fold 1240 is made along the third score 1130, forming an approximate perpendicular angle between the second panel 114 and the third panel 115. Finally, both the first corner fold 1210 and the second corner fold 1220 return to a perpendicular angle as well. Thus, the four corner folds now forming the novel open-ended box-like structure have an air-tight "seamless" connection formed by the two skived flaps 120 as shown. The remaining folds of the gable-end box can now be made at the remaining score 1100 locations. It should be noted that the novel air-tight "seamless" connection of the novel container device 100 can be applied to any number of geometric container shapes including cylindrical, which would not require corner folds as shown in the box-like geometry of FIG. 5.

This relatively seamless construction gives the container 100 the improved structural properties of one-piece/molded single-use plastic containers. Further, the direct bonding of each skived flap 120 ensures that unwanted moisture will not enter the container 100 and that the contents of the container 100 will not saturate the milk stock material via each flap's 120 exposed raw edge 121 due to the fact that each edge 121 is now protected and therefore cannot be saturated by any contents of the container 100.

FIG. 6A illustrates a diagrammatic view of a generalized skiving process 400 that is used on a container template body 110 of the present invention in accordance with the disclosed architecture. In general, the container template body 110 is fed into the feed roll 410 and is held tightly against the feed roll 410 by a presser foot 420. The feed direction 440 is from left to right as shown, with the feed roll 410 turning in a clockwise rotation direction 450. A cut-away portion of the bell knife 430 is shown creating the skiver chip 460 on the bottom surface of the container body template 110, thus forming the skived flap 120.

In a preferred embodiment, the container 100 may also be comprised of a three-pass method of creating a double-skived paper-based container 100. The three-pass method of the novel container device 100 includes: (i) forming and sealing a skived flap on the printed outside surface 111 of the fifth panel 117, (ii) forming and sealing a skived flap on the inside surface 112 of the first panel 113, and (iii) forming and sealing a joint formed by overlapping both skived flaps 120. Specifically, each pass will include a heating of a specific location on the container template body 110 for the purpose of softening and/or melting the polyethylene surface layer. Once the polyethylene surface layer has been heated, bonding and sealing of specific locations on container template body 110 can then take place. Compressive pressure is then applied to the top and bottom locations of the newly bonded joint until the polyethylene has had a chance to cool. The preferable bonding and sealing method will be further described in FIGS. 8 and 10. Notwithstanding, the present invention is not so limited and other methods involving more or less passes are also contemplated. Further, adhesives may also be used in place of, or in addition to, the heating of the polyethylene surface to create an air-tight joint. Returning now to the three-pass method, the two skiving operations will now be described.

FIG. 6B illustrates a top perspective view of the first pass skiving process 400 that is used on a container template body 110 of the present invention in accordance with the disclosed architecture. The first pass of the method is comprised of placing the container template body 110 of the novel container 100 into a skiving machine 400 with the inside surface 112 facing up and the top edge 118 of the container template body 110 oriented as the leading edge (i.e., the edge that enters the skiving machine first), and wherein the fifth panel 117 is fed into the feed roll 410 from the left side. Then, the container template body 110 is pressed between the presser foot 420 and the feed roll 410, wherein a bell knife 430 cuts the thickness of the container template body 110 to at least fifty to sixty percent of the container's 100 original thickness and to create a skived flap 120.

FIG. 6C illustrates a top perspective view of the second pass skiving process 400 that is used on a container template body 110 of the present invention in accordance with the disclosed architecture. The second pass of the method is comprised of placing the container template body 110 of the novel container 100 into a skiving machine 400 with the printed outside surface 111 facing up and the top edge 118 of the container template body 110 oriented as the leading edge (i.e., the edge that enters the skiving machine first), and wherein the first panel 113 is feed into the feed roll 410 from the left side. Then, the container template body 110 is pressed between the presser foot 420 and the feed roll 410, wherein a bell knife 430 cuts the thickness of the container template body 110 to at least fifty to sixty percent of the container's 100 original thickness and creates a second skived flap 120.

Figure 7:
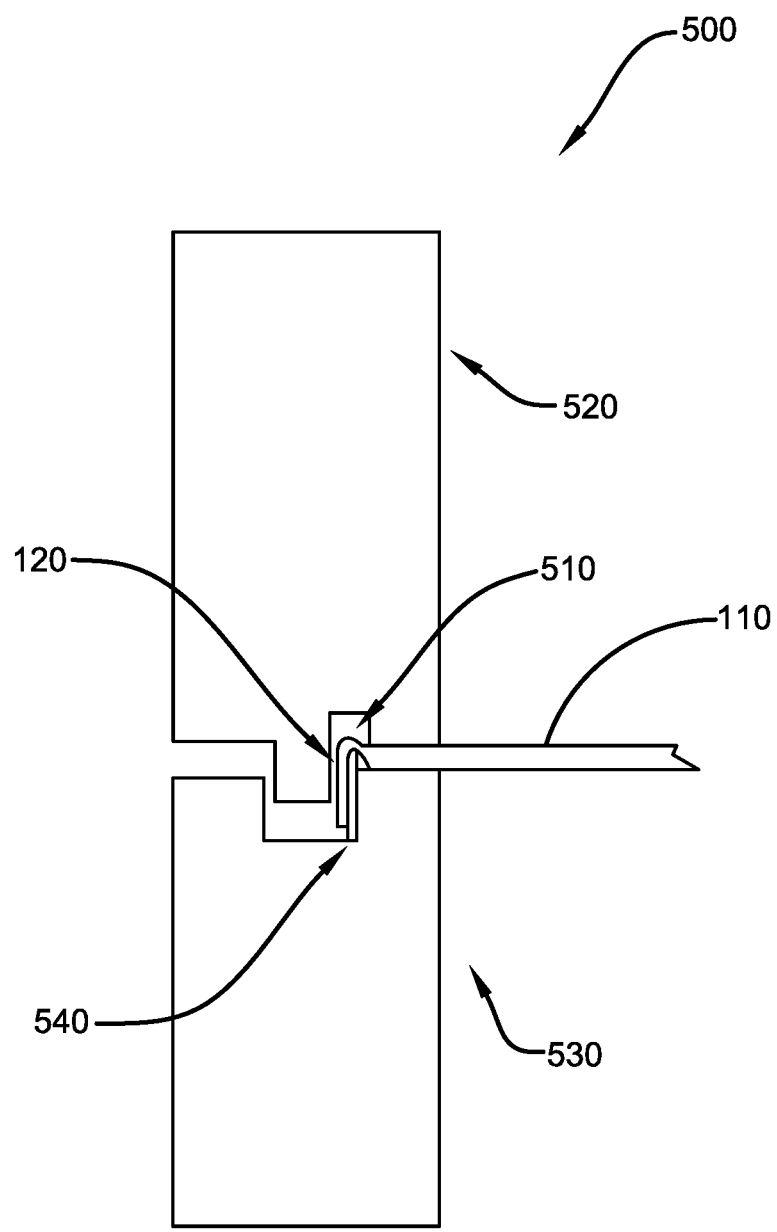
FIG. 7 illustrates a diagrammatic view of a generalized creasing process that is used on a container template body of the present invention in accordance with the disclosed architecture.

FIG. 7 illustrates a diagrammatic view of a generalized creasing process 500 that is used on a container template body 110 of the present invention in accordance with the disclosed architecture. Each skived flap 120, which was created using a previous skiving process 400, is then pushed between the upper crease roll 520 and the lower crease roll 530, thereby creating a crease 510 in skived flap 120. The creasing rule 540 provides support for the skiving flap 120 during the creasing process 500. The crease rolls 520 and 530 are spring-loaded with two springs at roughly a total of 400 pounds total pre-loaded compressive pressure, though other pressures are also contemplated (e.g., between 300-500, etc.).

Figure 8:
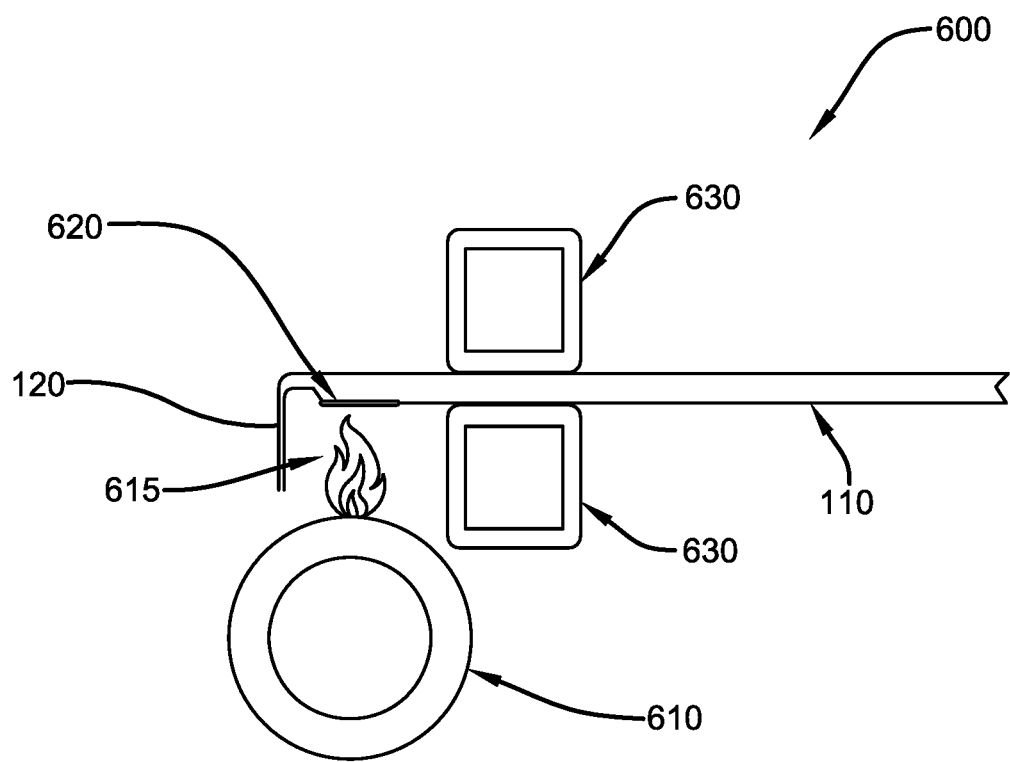
FIG. 8 illustrates a diagrammatic view of a generalized heating process that is used on a container template body of the present invention in accordance with the disclosed architecture.

FIG. 8 illustrates a diagrammatic view of a generalized heating process 600 that is used on the container template body 110 of the present invention in accordance with the disclosed architecture. The container template body 110 is then heated to create a softened/melted polyethylene zone 620, which is adjacent to the skived flap 120 for the purpose of adhering the skived flap 120 to the softened/melted polyethylene zone 620 on the surface of container template body 110. The softened/melted polyethylene zone 620 is heated by the burner unit 610 via an open flame 615, which activates the polyethylene lining of the container template body 110 material and causes it to become molten. The heating process 600 tends to work best when the burner unit 610 is in the range of 350-400° F. with a residence time over the flame of 0.2-0.35 seconds, though other temperature ranges and residence times are also contemplated and will depend upon the type and thickness of the particular materials being used. The equipment and the surrounding portion of the container template body 110 may then be cooled to approximately room temperature on each side by a plurality of water tubes 630, but the softened/melted polyethylene zone 620 and the skived flap 120 are not cooled.

Figure 9:
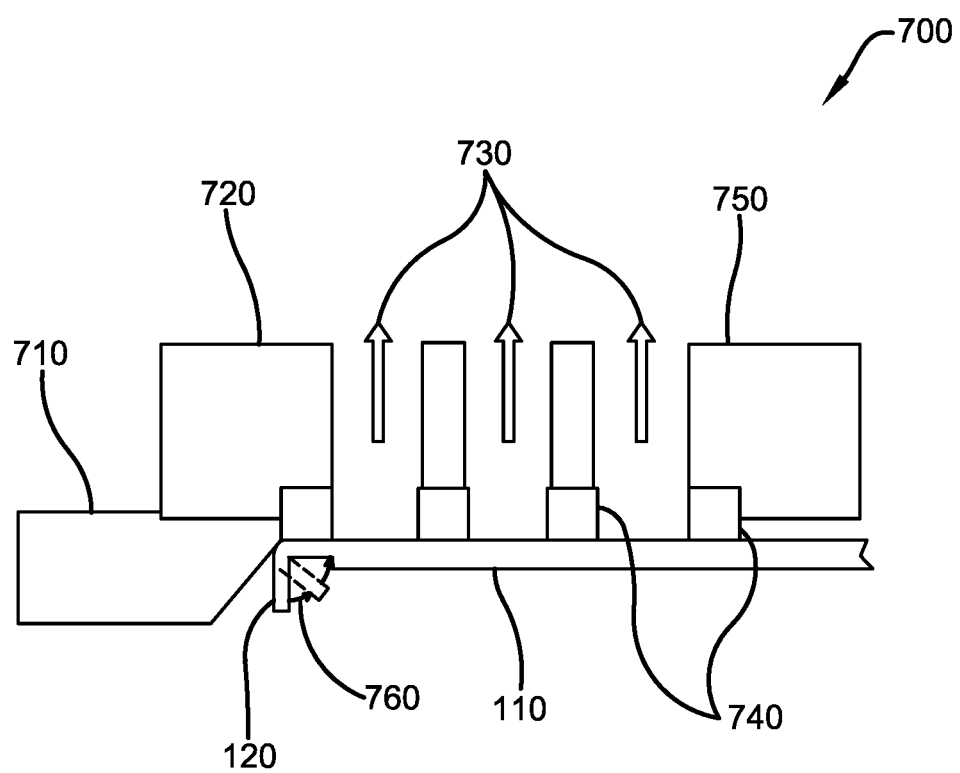
FIG. 9 illustrates a diagrammatic view of a generalized folding process that is used on a container template body of the present invention in accordance with the disclosed architecture.

FIG. 9 illustrates a diagrammatic view of a generalized folding process 700 that is used on a container template body 110 of the present invention in accordance with the disclosed architecture. After the heating process 600 has occurred and while the softened/melted polyethylene zone 620 is still at the proper temperature, the skived flap 120 will now undergo the folding process 700. With the container template body 110 held in place by a backer support 720, a vacuum 730, a vacuum belt 740, and possibly a vacuum plate 750; the hem spiral 710 now rotates in a counter-clockwise rotation, thus folding the skiving flap 120 along the folding path 760 until it comes to rest on the softened/melted polyethylene zone 620.

Figure 10:
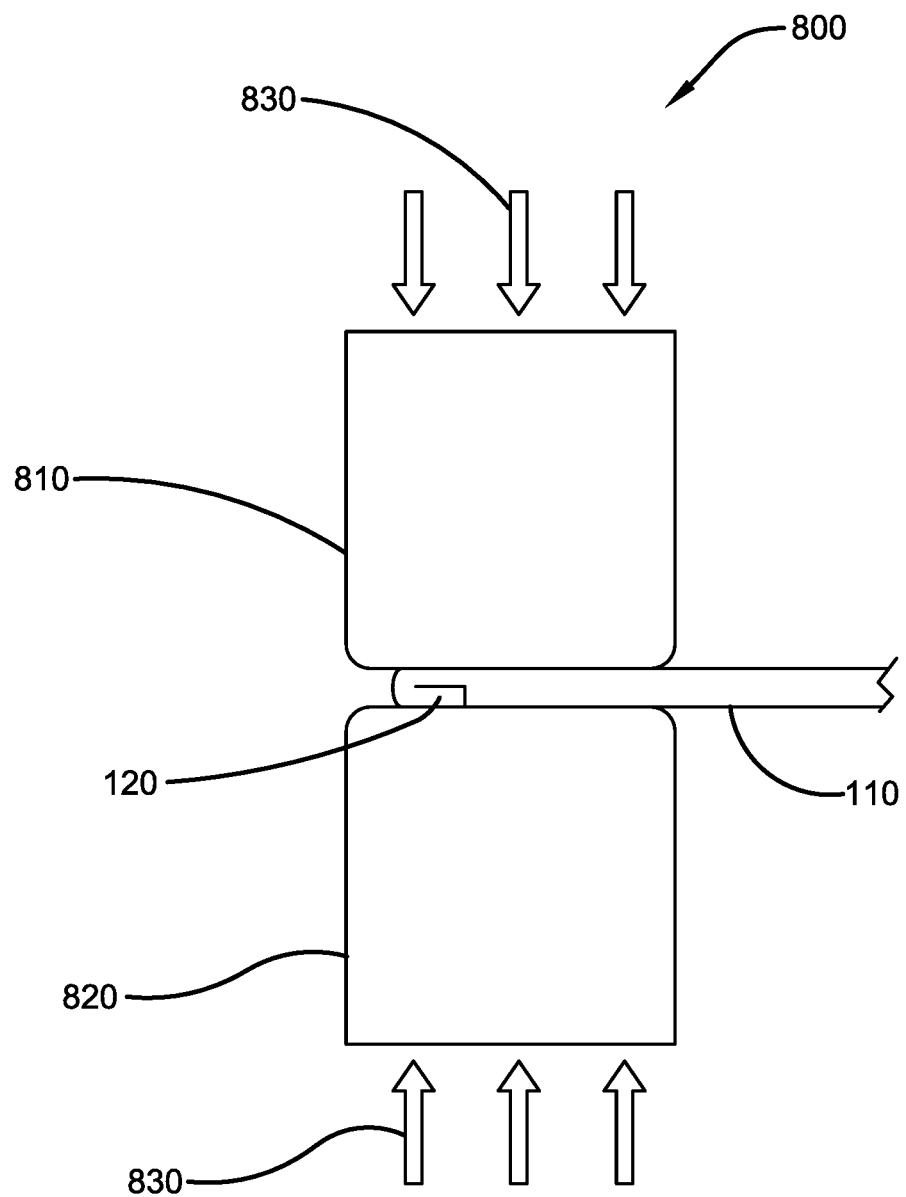
FIG. 10 illustrates a diagrammatic view of a generalized compressing process that is used on a container template body of the present invention in accordance with the disclosed architecture.

FIG. 10 illustrates a diagrammatic view of a generalized compressing process 800 that is used on a container template body 110 of the present invention in accordance with the disclosed architecture. Finally, a bond is formed between the skiving flap 120 and the softened/melted polyethylene zone 620 by the compressing process 800. Immediately following the previous folding process 700, the skiving flap 120 and the softened/melted polyethylene zone 620 are positioned between the upper pressure roll 810 and the lower pressure roll 820. Compressive force 830 is applied to rolls 810 and 820, thereby compressing the skived flap 120 and container template body 110 and held in place until the elevated temperature in the softened/melted polyethylene zone 620 is reduced. The bond at the skived flap 120 is now complete. The compressive force 830 is preferably between 575 and 625 pounds.

The third pass of the method ultimately creates the final seal of the container 100. To begin this step, the printed outside surface 111 of the fifth panel 117 near the first skived edge 122 is heated by a burner unit 610 via an open flame 615, which causes the polyethylene lining of the container 100 to soften and/or become molten, as described above and best shown in FIGS. 3 and 8. To aid in cooling, the container template body 110 may be cooled on each side 111, 112 by a plurality of water tubes 630, as also described above and as best shown in FIG. 8. Then, the inside surface 112 of the first panel 113 near the second skived edge 123 is then heated by a burner unit 610 via an open flame 615 which activates the polyethylene lining of the container 100 and causes it to become molten, as best shown in FIGS. 3 and 8. To aid in cooling, the container template body 110 may then be cooled on each side 111, 112 by a plurality of water tubes 630 as best shown in FIG. 8.

The container template body 110 is then folded along the second score 1120, which allows the fourth panel 116 and fifth panel 117 to be folded over inward towards the center of the body 110, as best shown in FIG. 3. Then, the body 110 is folded along the fourth score 1140, which allows the first panel 113 to be folded over inwards and over top of the fifth panel 117, as best shown in FIGS. 3 and 4. Once in this orientation, the raw carton edge 121 of each skived flap 120 that was created from the first panel 113 and the fifth panel 117 is sealed inside and is not exposed to the inside surface 112 or outside surface 111 of the container 100, as best shown in FIG. 4. Finally, the folded container 100 is pushed through an upper pressure roll or belt 810 and lower pressure roll or belt 820, which seals the bond between both skived flaps 120 created from the first and fifth panels 113, 117 on both surfaces 111, 112 of the body 110, as best shown in FIGS. 4 and 10. Once sufficient cooling has taken place, the folded container 100 as shown in FIG. 4 can be opened into a box-like structure by folding along the first score 1110 and the third score 1130 as shown in FIG. 5.

Notwithstanding the foregoing, the improved paper-based container device 100 can be of any suitable size, shape, and configuration as is known in the art without affecting the overall concept of the invention, provided that it accomplishes the above-stated objectives. One of ordinary skill in the art will appreciate that the shape and size of the container device 100 and its various components, as show in the FIGS. are for illustrative purposes only, and that many other shapes and sizes of the container device 100 are well within the scope of the present disclosure. Although dimensions of the container device 100 and its components (i.e., length, width, and height) are important design parameters for good performance, the container device 100 and its various components may be any shape or size that ensures optimal performance during use and/or that suits user need and/or preference. As used herein, the term biodegradable means fully or partially biodegradable. Further, the container device 100 may also be renewable, recyclable, and is considered green or eco-friendly.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An improved container comprising:
   a body portion comprising a plurality of panels; and
   at least two skive flaps each formed on one of the plurality of panels, wherein each of the at least two skive flaps is comprised of a raw edge that is completely sealed between each of the at least two skive flaps; and
   wherein each of the at least two skive flaps is 50-60 percent thicker than the respective panel; and
   wherein the at least two skive flaps are bonded together forming a leakproof connection where no portion of each raw edge is exposed to an inside surface or an outside surface of the container.

2. The improved container of claim 1, wherein the body portion is comprised of a paper based material.

3. The improved container of claim 1, wherein a first of the at least two skive flaps is positioned on an interior of the improved container and a second of the at least two skive flaps is positioned on an exterior of the improved container.

4. The improved container of claim 1, wherein a flame is used to heat and adhere the at least two skive flaps to a surface of the body portion.

5. The improved container of claim 1, wherein the at least two skive flaps are formed by planing.

6. The improved container of claim 1 further comprising a first panel, a second panel, a third panel, a fourth panel and a fifth panel.

7. The improved container of claim 6, wherein a first skived edge of at least one of the at least two skive flaps is formed using the first panel or the fifth panel.

8. The improved container of claim 6, wherein at least one of the at least two skive flaps forms an air tight connection to the first panel.

9. The improved container of claim 1 further comprising a first score, a second score, a third score and a fourth score.

10. The improved container of claim 9 further comprising a first corner fold, a second corner fold, a third corner fold and a fourth corner fold.

11. The improved container of claim 1 further comprising a first corner fold, a second corner fold, a third corner fold and a fourth corner fold.

12. The improved container of claim 1, wherein each of the at least two skive flaps comprises a first end and a second end and further wherein each of the first and second ends are comprised of a bevel or a chamfer.

13. A double-skived paper-based container comprising:
    a container template comprised of a first panel, a second panel, a third panel, a fourth panel and a fifth panel; and
    a first skived flap formed on an outside surface of the fifth panel, wherein the first skived flap comprises a first raw edge cut-away portion that is 40-50 percent thinner than the fifth panel that is folded over and is sealed between the first skived flap; and
    a second skived flap formed on an inside surface of the first panel, wherein the second skived flap comprises a second raw edge cut-away portion that is 40-50 percent thinner than the first panel that is folded over and is sealed between the second skived flap; and
    wherein the first and second skive flaps are bonded together forming a leakproof connection where no part of the first and second raw edge cut-away portions are exposed to an inside surface or an outside surface of the container.

* * * * *